(12) United States Patent
Elenes

(10) Patent No.: US 7,300,148 B2
(45) Date of Patent: Nov. 27, 2007

(54) FLEXIBLY SUPPORTED PRINTER

(75) Inventor: Luis Elenes, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 594 days.

(21) Appl. No.: 10/730,538

(22) Filed: Dec. 8, 2003

(65) Prior Publication Data

US 2005/0162496 A1    Jul. 28, 2005

(51) Int. Cl.
*B41J 29/13* (2006.01)

(52) U.S. Cl. .................. 347/108; 347/170; 248/618

(58) Field of Classification Search ............... 347/108, 347/170, 263; 346/145; 400/691; 248/565, 248/618
See application file for complete search history.

(56) References Cited

U.S. PATENT DOCUMENTS

| | | | |
|---|---|---|---|
| 6,309,044 B1 | 10/2001 | Gaarder | |
| 6,473,152 B1 * | 10/2002 | Yokota | 347/108 |
| 6,542,925 B2 | 4/2003 | Brown et al. | |
| 6,991,332 B1 * | 1/2006 | Fan et al. | 347/108 |
| 2002/0158955 A1 * | 10/2002 | Hess et al. | 347/108 |

* cited by examiner

*Primary Examiner*—Manish S. Shah (57) ABSTRACT

A flexibly supported printer includes a printer and a flexible support supporting the printer. Movement of internal components of the printer causes the printer to move by flexing the flexible support.

7 Claims, 8 Drawing Sheets

FLEXIBLY SUPPORTED PRINTER

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Frequently, it is desirable to generate a hardcopy of a document or data set that has been produced or stored on a personal computer. Consequently, a wide variety of printers and printing devices have been developed that can receive a print job from a host computer and produce a hardcopy of the document or data represented by that print job.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

During the operation of a typical printer, a print head moves over and relative to the print medium to print the image specified by the print job on that print medium. Additionally, the print medium is typically moved relative to the print head so as to, for example, advance the print medium and allow the print head to print successive lines on the desired image on the print medium.

This movement of some components of a printer typically has a very minimal effect on the printer as a whole. Typical printers are heavy enough to remain solidly in place despite the internal movement of the print head or the print medium.

However, it has been discovered that, if a printer is flexibly supported as will described herein, the movement of the print head can cause the printer to rock and gyrate as though the printer is dancing. In particular, changes in acceleration as the print head stops or starts from rest cause movement in a flexibly supported printer. This movement is quite entertaining and amusing to watch. Consequently, the present specification describes a printer in several embodiments that is flexibly supported so as to allow the printer to "dance" while a document is being printed.

As used herein and in the appended claims, the terms "printer" and "printing device" are defined to mean any device that produces a hardcopy from electronic data, including, but not limited to, laser printers, inkjet printers, dot matrix printers, plotters, facsimile machines, digital copiers, photocopiers, multifunction peripherals, and the like. A printer or printing device may produce images on a variety of print media and may produce images that are in color or are monochromatic.

The term "print job" is defined as data that has been specifically formatted for submission to a particular printer from which the printer can generate a hardcopy representing the underlying document or data set from which the print job was created. Typically, the print job is transmitted from a host or "client" computer to the printer.

Most personal computers include programming that will be referred to generally as a "printer driver." A printer driver is a piece of software or firmware that receives data or a document that is to be printed from an application running on the computer. The printer driver formats the data for use by a corresponding printer, i.e., creates a print job, and then transmits the print job to the printer. Using the print job, the printer can produce a hardcopy of the underlying data or document.

Figure 1:
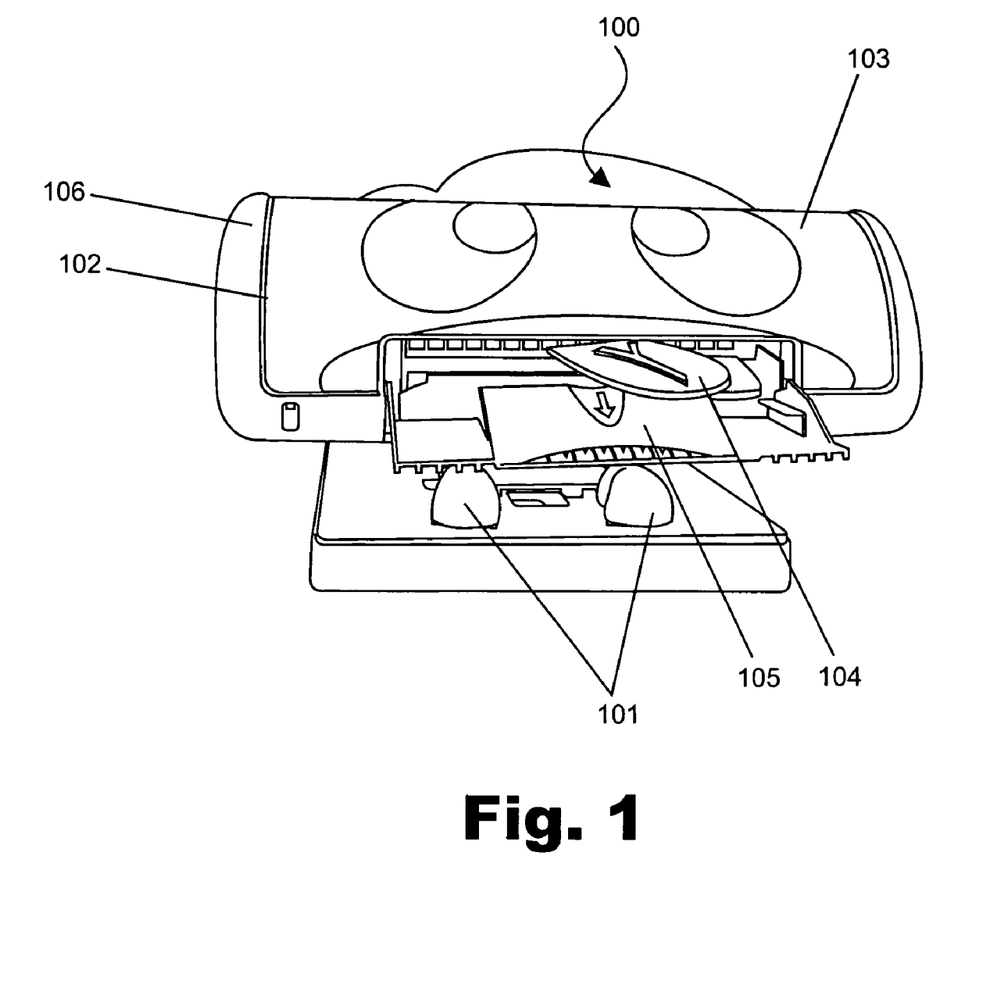
FIG. 1 illustrates a flexibly supported printer according to a first embodiment of the technology described herein.

FIG. 1 illustrates a flexibly supported printer (100) according to one embodiment of the technology described herein. As shown in FIG. 1, the printer (100) includes a main body (106) supported on flexible legs (101). The main body (106) optionally includes the various components of a typical printer, for example, a print head, toner or ink cartridges, a supply of print medium such as paper, a print medium transport system, an output area (105) where printed documents are output, a connection to a host system for receiving print jobs, a power connection for receiving power, etc.

The main body (106) is supported on flexible legs (101). In the illustrated embodiment, three flexible legs are used and will be described in more detail below. The three legs are arranged in a triangular formation to give the printer (100) stability. The front two legs (101) may have feet that are formed to appear, for example, as shoes or human feet to give character to the dancing printer (100). Such feet may be made from a wide variety of materials, for example, fiberglass, nylon, foam, rubber, plastic, etc.

The main body (106) of the printer (100) may also include a transparent cover (102) that is made, for example, of clear or transparent plastic. The transparent cover (102) is snapped or otherwise attached to the body (106) of the printer (100) so that the cover (102) can be detached from the body (106). Alternatively, the transparent cover (102) may be hinged to the body (106). In either case, the cover (102) can be opened to expose the upper surface of the body (106) of the printer (100).

With a transparent cover (102) as described, a user can place a printed face (103), i.e., a face printed on a sheet of print medium such as paper, on the body (106) of the printer (100) and then close the cover (102) over that printed face (103) to hold the printed face (103) in place on the body (106) of the printer (100). The printed face (103) is then visible through the transparent cover (102). Again, this adds character to the dancing printer (100) and allows a user to design or personalize the "face" of the dancing printer (100). Alternatively, any design desired by a user other than a face could be printed and disposed under the transparent cover (102) to decorate the printer (100).

Lastly, a tongue (104) may be provided. The tongue (104) may be made from plastic, cardboard, Styrofoam, rubber, or other suitable materials. In some embodiments, the tongue (104) is connected to the moving carriage of the print head. Consequently, as the print head carriage moves laterally from side to side across a print medium, the tongue (104) is wagged from side to side giving the printer (100) additional animation.

The tongue (104) may be directly connected to and supported on the print head carriage so as to move with the carriage. Alternatively, the tongue may be pivotally connected to the body of the printer (100) so that the outer tip of the tongue (104) moves opposite to the movement of the internal print head carriage. In some embodiment, the user may be able to print or otherwise form a desired configuration for the tongue (104) and connect the customized tongue to the printer (100).

Figure 2:
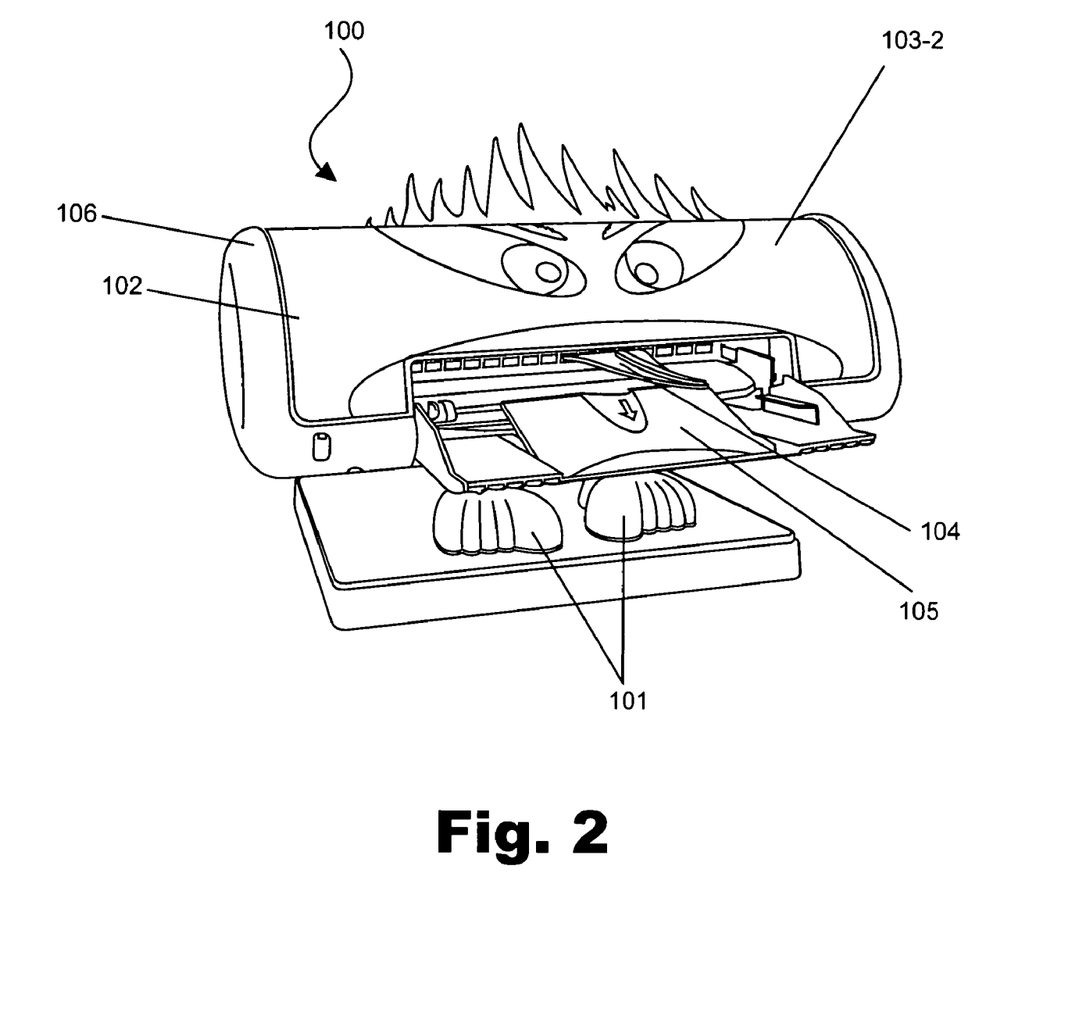
FIG. 2 illustrates a flexibly supported printer according to a second embodiment.

FIG. 2 again illustrates the dancing printer (100) of FIG. 1. However, in FIG. 2, a different printed face (103-2) has been created for the printer (100). As described above, the printed face (103-2) can be factory installed or can be selected or created by a user, printed and installed on the printer body (106) by removing the transparent cover (102) and placing the printed face (103-2) on the printer body (106) under the transparent cover (102). The transparent cover (102) is then replaced to protect the printed face (103-2) and hold the printed face (103-2) in place on the printer body (106).

Figure 3:
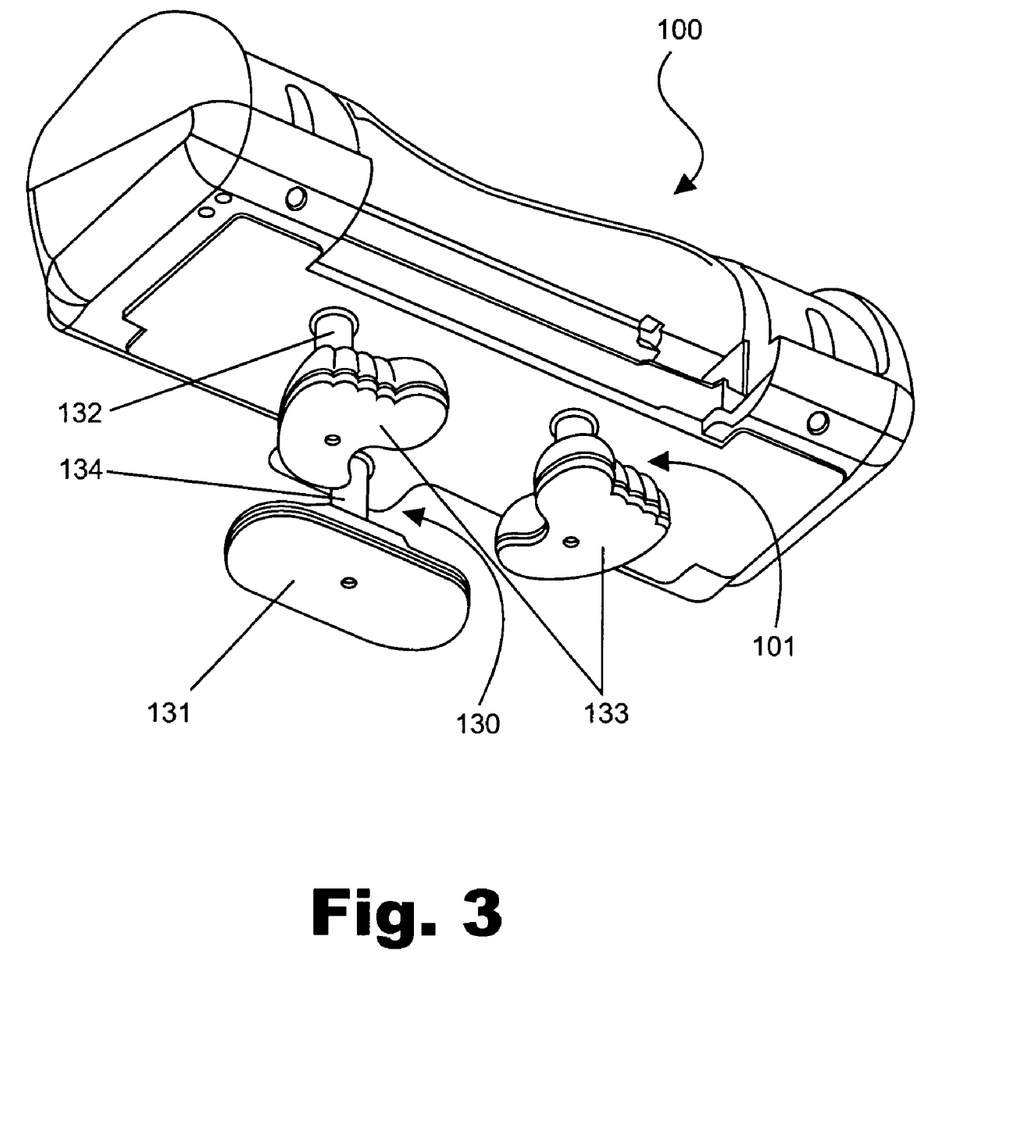
FIG. 3 illustrates an underside of a printer according to one embodiment of the technology described herein.

FIG. 3 illustrates in more detail the flexible legs (101, 130) used to support the printer (100) according to one possible embodiment of the technology described herein. In the example shown in FIG. 3, three legs (101, 130) used to support the printer (100). Each leg (101, 130) includes a foot (131, 133) and a flexible support (132, 134). The flexible support may be, for example, a coil spring.

The two front legs (101) may be identical or matched. Each includes a foot (133) and a flexible support (132). The foot (133) typically has a flat bottom for resting against the surface on which the printer (100) is placed. The upper portion of the foot (133) may be formed to resemble shoes, human feet, animal feet or any other object to give character to the printer (100). The flexible support (132) may be a coil spring.

The rear leg (130) also includes a foot (131) and a flexible support (134). Again, the foot (131) typically has a flat bottom for resting against the surface on which the printer (100) is placed. As the rear leg (130) is not readily visible, the upper portion of the rear foot (131) may or may not have any particular design.

As shown in FIG. 3, the front legs (101) and the rear leg (130) may be arranged in a triangle under the printer (100). This provides stability for the printer (100) even when the printer (100) wiggles on the flexible legs (101, 130). The rear foot (131) may be larger and more stable than the two front feet (133). Similarly, the rear flexible support (134) may be stiffer or have a higher spring constant than the two front flexible supports (132). This makes the rear leg (130) an anchor leg that holds the printer (100) in place relative to the surface on which the printer (100) rests. Consequently, the front legs (101) can flex and bounce more freely. In fact, the front feet (133) may even loose contact with the surface on which the printer (100) is resting as the printer (100) dances on the flexible legs (101, 130). Meanwhile, the anchor leg (130) prevents the printer (100) from bouncing off the desktop or interfering with other desktop equipment.

Figure 4:
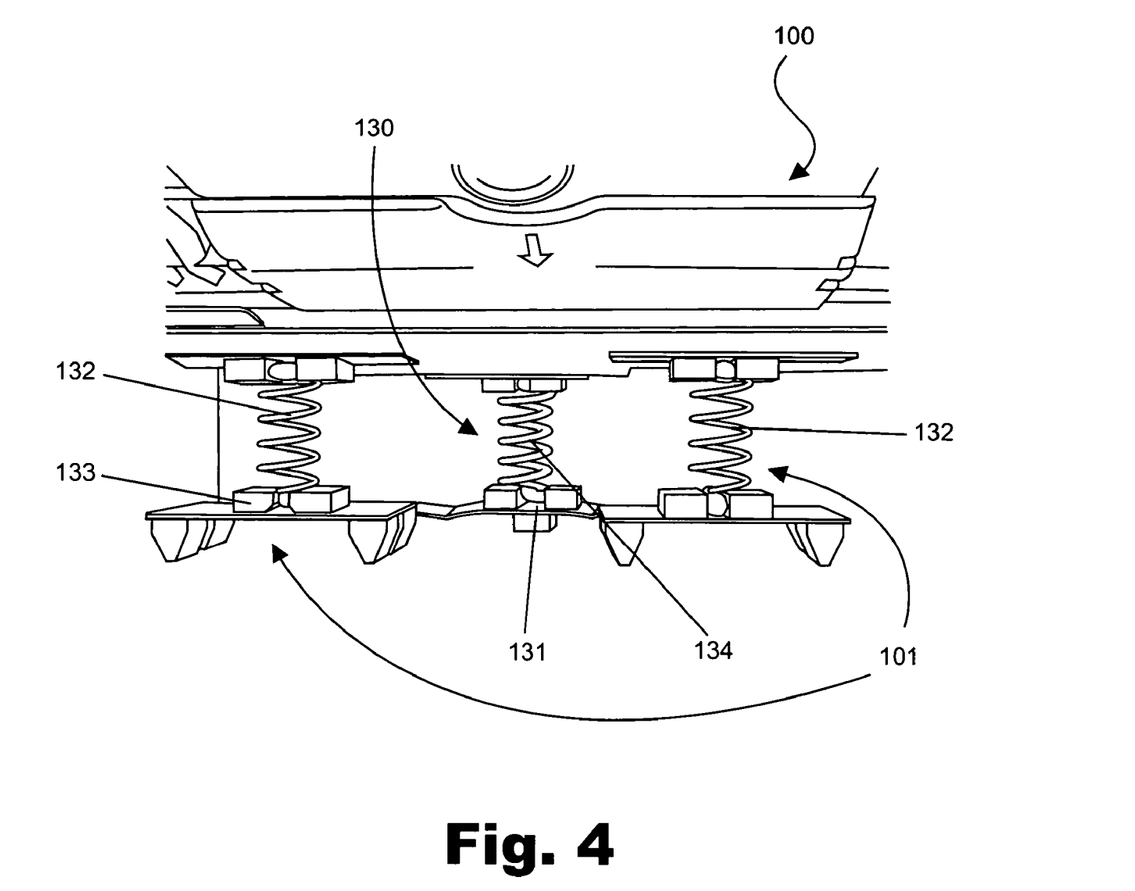
FIG. 4 illustrates a detailed view of the flexible legs used to support a printer according to one embodiment.

FIG. 4 illustrates another embodiment in which the front feet (133) of the flexible legs (100) are not shaped to resemble feet or shoes, but are plates supported on, for example, rubber tips. The rear foot (131) is similar.

In some embodiments, the printer body (106, FIG. 1) may also be dressed in clothes for added character. Such clothes may include, for example, a grass skirt or the like, that hangs from the body (106) of the printer (100) and covers the flexible legs (101, 130). In such an embodiment, it may be unimportant to shape the front feet (133) in any particular way. Consequently, in such an embodiment, the front feet (133) may be formed as shown in FIG. 4.

FIG. 4 also illustrates that the flexible supports (132) of the two front legs (101) may be less stiff than the flexible support (134) of the rear leg (130). In the example of FIG. 4, the flexible supports (132, 134) are all coil springs. As can be seen in FIG. 4, the coil spring of the rear leg (130) is more tightly coiled and stiffer than the coil springs of the front legs (101). As indicated above, the high spring constant of the rear leg (130) makes the rear leg (130) an anchor that holds the printer (100) in place relative to the surface on which the printer (100) rests.

Figure 5:
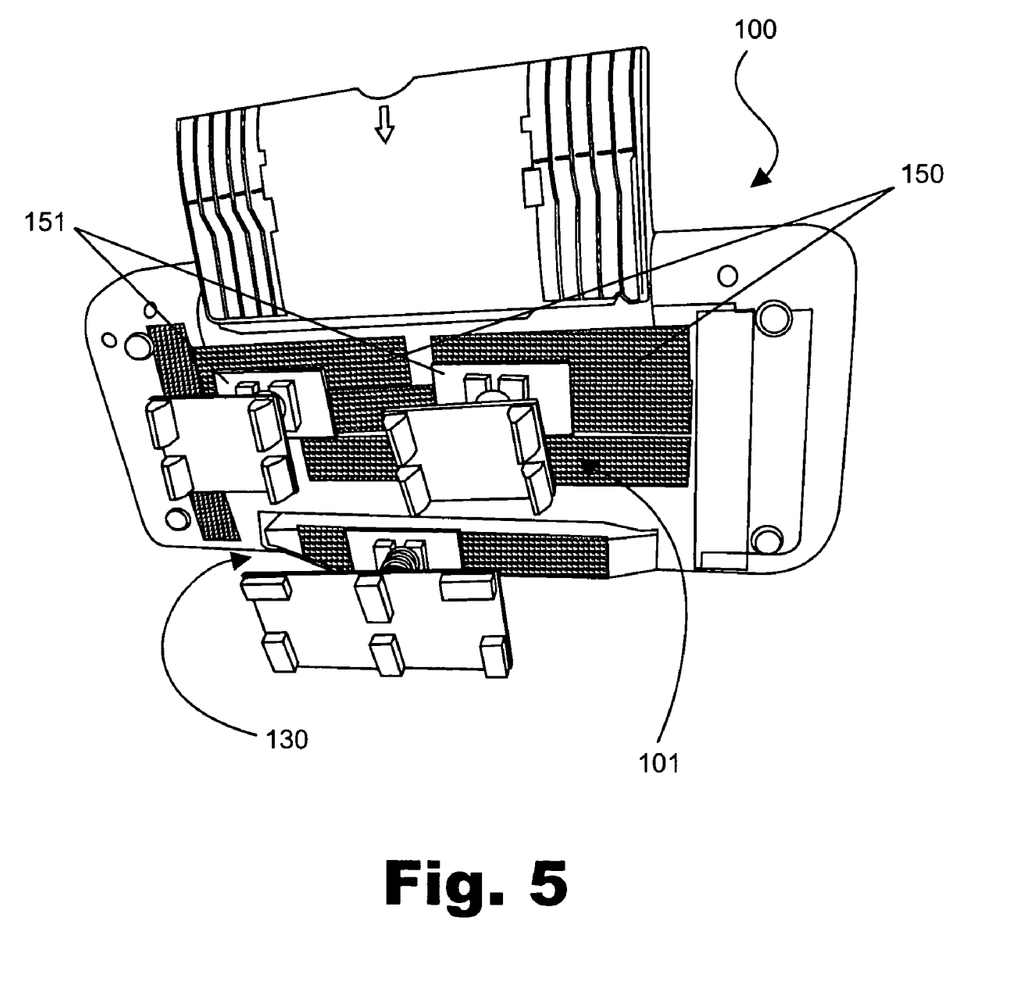
FIG. 5 illustrates another underside view of a printer according to another embodiment.

FIG. 5 illustrates another possible embodiment of a flexibly supported printer (100). The motion of the flexibly supported printer (100) depends significantly on the relatively placement of the flexible legs supporting the printer relative to each other and to the body of the printer. By adjusting the relative position of the flexible legs (101, 130), the amplitude and pattern of the movement of the printer (100) can be controlled.

Consequently, as shown in FIG. 5, some embodiments may allow the flexible legs (101, 130) to be removably attached to the underside of the printer (100) so that the legs (101, 130) can be attached, detached, changed or rearranged as suits the desire of a user.

For example, hook and loop fasteners, such as Velcro, provide a piece of fabric of small hooks that can be fastened to a corresponding fabric of small loops. As shown in FIG. 5, strips of hook and loop fastener (150) can be attached to the underside of the printer (100). A corresponding fastener pad (151) is provided at the top of each of the flexible legs (101, 130). Consequently, the legs (101, 130) can be readily attached or detached from the printer (100), and the positioning of the legs (101, 130) relative to each other and to the body of the printer (101) can be readily adjusted according to the tastes of the user.

The strips of fastener (150) on the printer (100) are large enough to permit significant variation in the placement of the flexible legs (101, 130). In fact, the entire underside of the printer (100) may be covered with hook and loop fastener in some embodiments. In other embodiments, the fastener strips (150) may be sized and positioned to suggest placement of the flexible legs (101, 130) in relative positions that are stable or provide particularly interesting movement of the printer (100) when operated.

Additionally, the geometry or shape of the feet (131, 133) also affects the stability and subsequent motion of the printer (100). Thus, the size and shape of the feet (131, 133) can be selected or changed to change the "dancing" of the printer (100).

Figure 6:
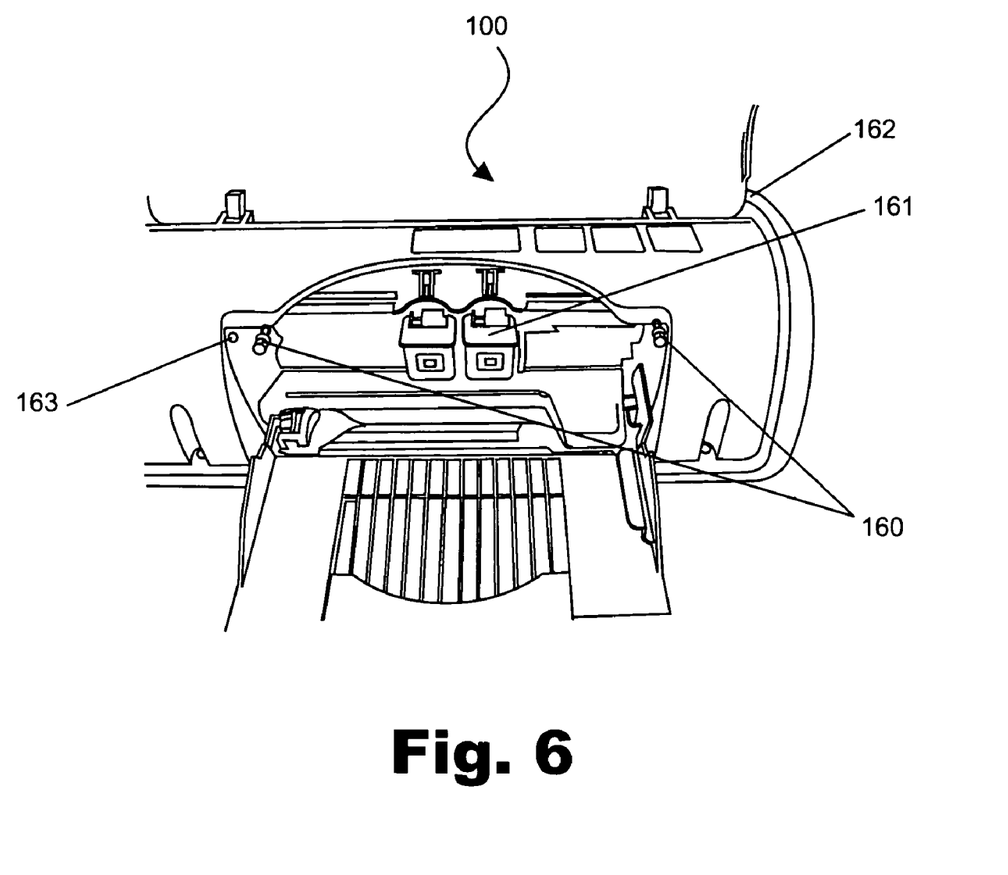
FIG. 6 illustrates internal components of a printer according to one embodiment.

FIG. 6 illustrates some of the internal components of a printer according to the technology described herein. As shown in FIG. 6, the interior of the printer (100) includes the print head carriage (161), the movement of which causes the "dancing" of the printer (100) on its flexible supports.

Additionally, one or more light sources (160) may be disposed to light the printer output area (105, FIG. 1). These lights (160) may be colored. The lights (160) may be light emitting diodes (LEDs).

To give additional character to the "dancing" of the printer (100), the lights (160) can flash in coordination with the movement of the printer (100). For example, the lights (160) may be driven with a timing derived from the print job such that the lights are flashed when the print head is accelerating or decelerating based on the execution of the print job. Alternatively, a motion sensor (163) can be disposed in the printer (100). The motion sensor (163) can be configured to detect either the motion of the printer (100) or the motion of a user at or near the printer. The output of the motion sensor (163) is then used to drive the lights (160) such that the flashing of the lights (160) is coordinated with movement of the printer (100) or in response to motion of a user, as though the printer is responding to the user.

Additionally, a speaker (162) may be included in the printer to generate noises that coincide with movement of the printer (100). The speaker (162) may output, for example, music, speech, animal vocalizations, synthesized sounds or any other sounds to give character to the movement of the printer.

The speaker (162) can be driven with audio data included in the print job being executed by the printer. Thus, the user can associate audio with a print job that the printer should output from the speaker (162) during printing. Alternatively, the speaker (162) can be driven by audio data stored in the printer (100).

The driving of the speaker (162) can coincide with printing. Alternatively, the driving of the speaker (162) can coincide with output from the motion sensor (163) so as to correlate the sound with the motion of the printer (100) or in response to the movement of a nearby user.

Figure 7:
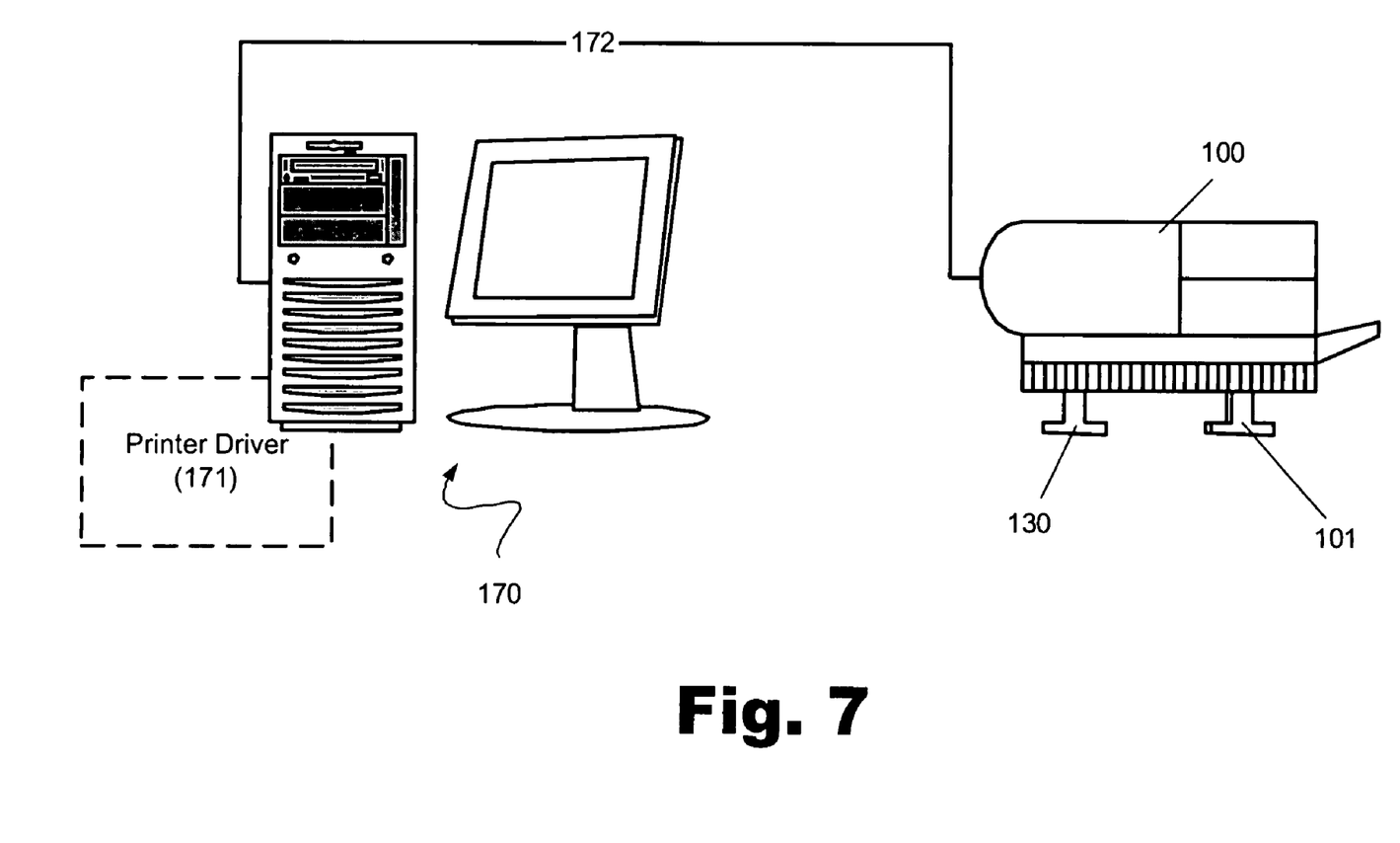
FIG. 7 illustrates a printer and an accompanying host computer system with printer driver according to one embodiment.

FIG. 7 illustrates a printer and an accompanying host computer system with printer driver according to one embodiment. As shown in FIG. 7, the flexibly supported printer (100), supported, for example, on flexible legs (101, 130), is connected (172) to a host computer (170). The connection (172) between the host computer (170) and the printer (100) may represent a direct connection between the host computer and the printer, or a network connection.

The host computer (170) includes a printer driver (171) for generating print jobs to be sent to the printer (100). As described herein, the printer driver (171) may modify the print job sent to the printer (100) to make additional use of the "dancing" capabilities of the printer (100). For example, the printer driver (171) may command additional movement of the print head carriage in the print job beyond the movement required to print the image of the print job. This additional carriage movement is intend to increase, exaggerate, accelerate or time the resulting movement of the printer (100) that results from the acceleration of the print head carriage.

Thus, a printer driver stored as computer-readable instructions on a medium for storing computer-readable instructions may, when executed on a host computer, cause the computer to generate a print job, where the print job causes some movement of a print head carriage in a flexibly supported printer that results in movement of said flexibly supported printer and flexing of the printer's flexible support and which movement is not needed to produce a printed output.

Additionally, the printer driver (171) may attach audio data to the print job that is then output through the speaker (162, FIG. 6) of the printer (100). In some embodiments, the audio can be amplified through a sound card of the computer (170) and controlled remotely through the printer driver (171). As indicated above, a user may select specific audio data using the printer driver (171) to send to the printer (100).

In addition to the printer driver (171), the firmware in the printer (100) can be modified to enhance the movement of the printer (100). For example, the firmware could drive the print head carriage to perform specific dance moves before and/or after executing a print job. Alternatively, the firmware could exaggerate or otherwise modify the movement of the print head carriage to enhance the movement of the printer (100).

Thus, firmware for a flexibly supported printer, stored as computer-readable instructions on a medium for storing computer-readable instructions, may, when executed on a printer, cause movement of a print head carriage without doing any printing so as to cause said printer to move by flexing the printer's flexible support. Specifically, the additional movement of the print head carriage is performed prior to commencing a print job or subsequent to completing a print job. The firmware may also selectively drive lights on the printer in response to the movement of the printer. The firmware may also selectively output audio by driving a speaker in response to the movement of the printer.

Figure 8:
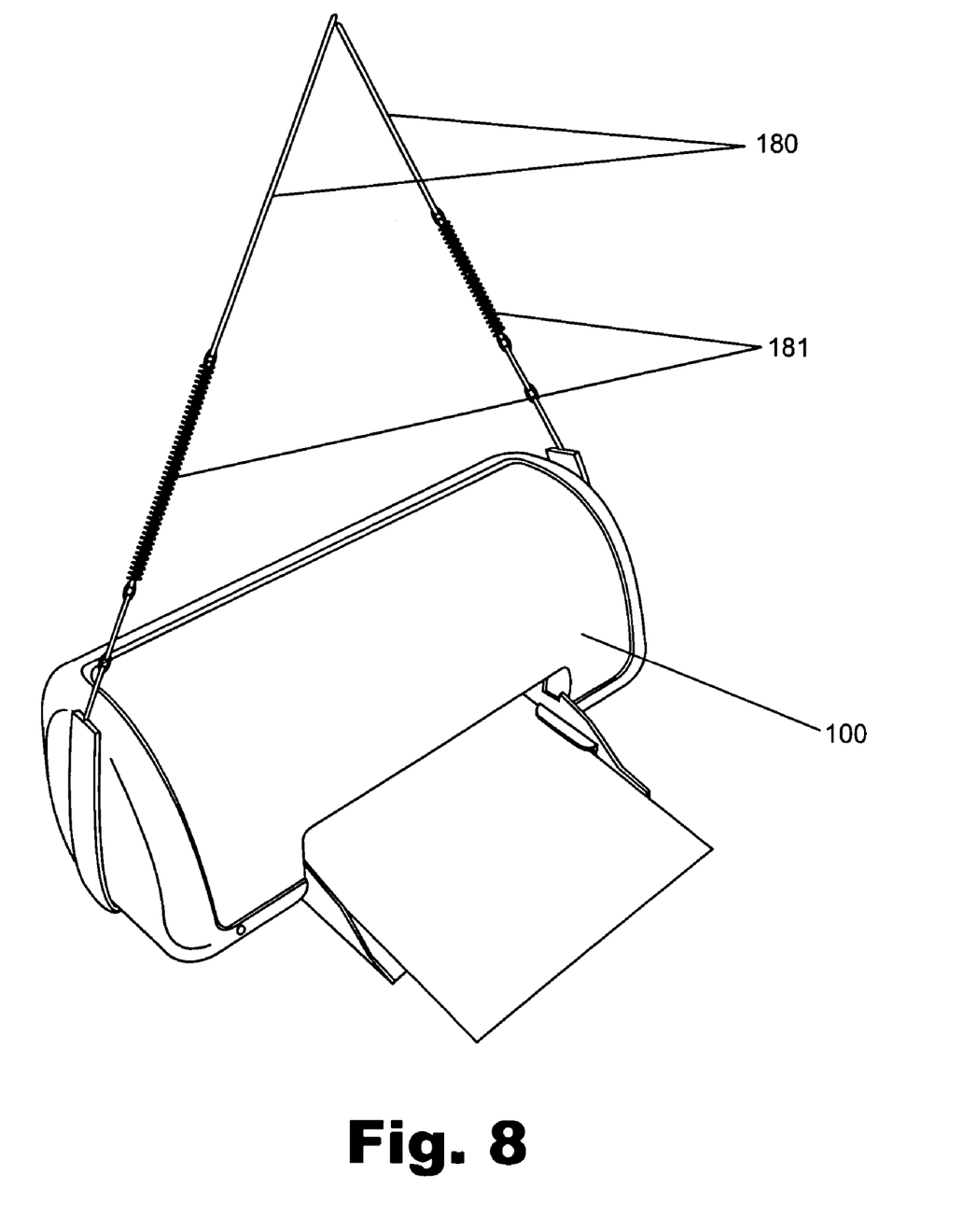
FIG. 8 illustrates a flexibly supported printer according to still another embodiment.

FIG. 8 illustrates a flexibly supported printer according to still another embodiment. As shown in FIG. 8, a printer (100) can be flexibly supported in ways other than using the flexible legs described above.

In FIG. 8, a printer (100) is flexibly supported by flexible cables (180). As with the flexible legs described above, the flexible cables (180) allow the printer (100) to move, wiggle, swing, etc. in response to the acceleration and side-to-side motion of the internal print head carriage. The flexible cables (180) used to support or suspend the printer (100) can be arranged in a variety of configurations. As shown in FIG. 8, the cables (180) may extend from either end of the printer (100) to a common point. Alternatively, the cables (180) may be parallel.

Additionally, springs (181) can be incorporated into the cables (180) to increase the movement of the printer (100) in response to internal print head carriage acceleration.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A flexibly supported printer comprising:
   a printer; and
   a flexible support supporting said printer;
   wherein movement of internal components of said printer causes said printer to move by flexing said flexible support;
   wherein said flexible support comprises one or more flexible legs;
   wherein each said flexible leg comprises a foot and a spring; and
   wherein said printer comprises a plurality of flexible legs, with the springs of at least two of said flexible legs having different spring constants.

2. The printer of claim 1, wherein said flexible support comprises three of said legs arranges in a triangle.

3. The printer of claim 2, wherein a front two of said three flexible legs have springs of a first spring constant and a rear leg of said three flexible legs has a spring has a second spring constant, said second spring constant being greater than said first spring constant.

4. A flexibly supported printer comprising:
a printer; and
a flexible support supporting said printer;
wherein movement of internal components of said printer causes said printer to move by flexing said flexible support;
wherein said flexible support comprises one or more flexible legs;
wherein each said flexible leg comprises a foot and a spring; and
wherein said foot is shaped like a human foot.

5. A method of operating a printer, said method comprising:
flexibly supporting said printer with a flexible support; and
causing said printer to move by flexing said flexible support in response to acceleration of internal components of said printer;
wherein flexibly supporting said printer comprises supporting said printer on three or more flexible legs arranged in a triangle; and
wherein one or more of the flexible legs comprises a spring.

6. The method of claim 5, wherein a front two of said three flexible legs have springs of a first spring constant and a rear leg of said three flexible legs has a spring with a second spring constant, said second spring constant being great than said first spring constant.

7. The method of claim 5, wherein the spring comprises a coil spring.

* * * * *